United States Patent Office 3,247,089
Patented Apr. 19, 1966

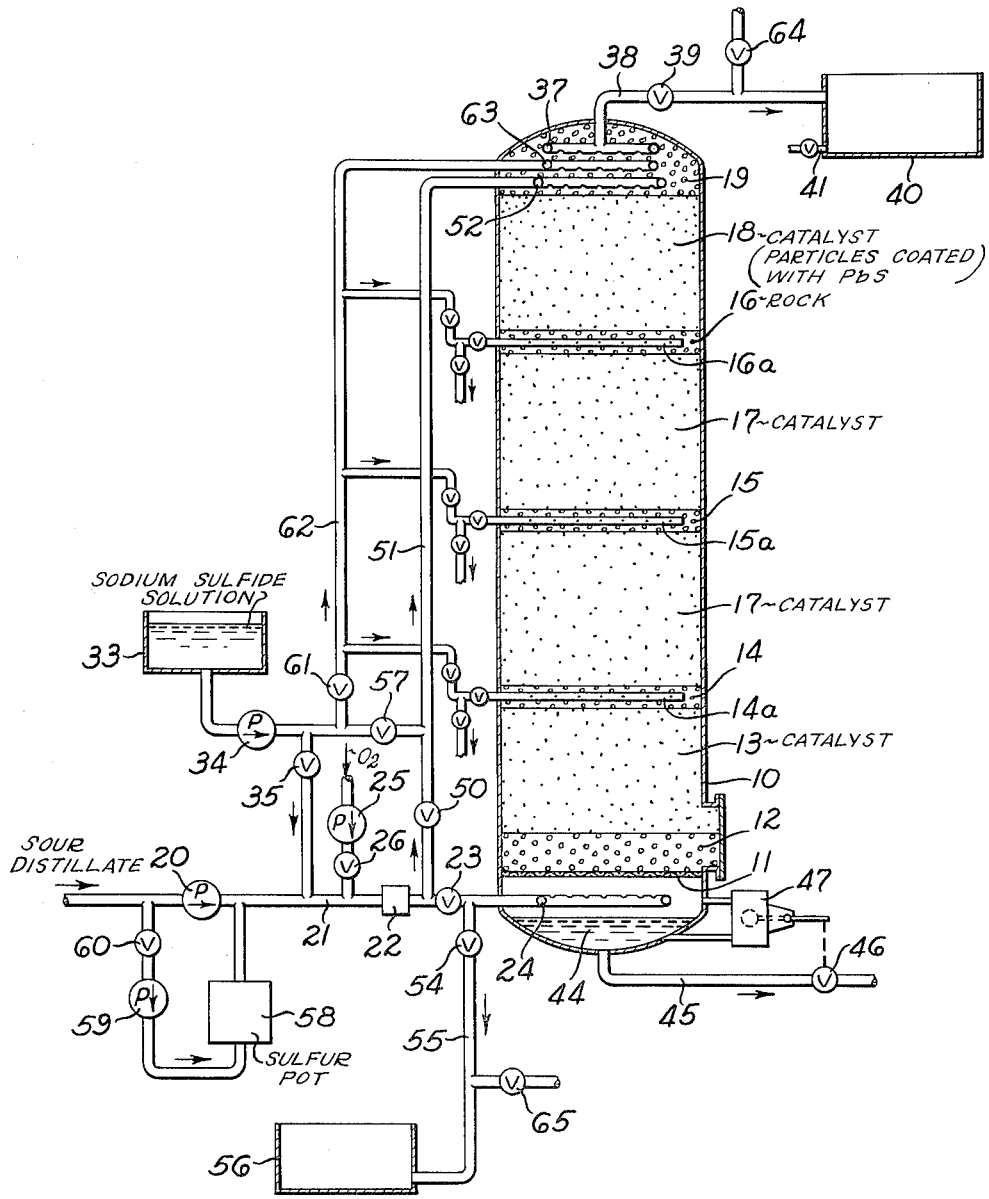

3,247,089
PROCESS OF SWEETENING DISTILLATES
Frederick D. Watson and Albert D. Franse, Houston, Tex., and Robert L. Pettefer, Long Beach, Calif., assignors to Petrolite Corporation, Wilmington, Del., a corporation of Delaware
Filed Aug. 29, 1963, Ser. No. 305,326
13 Claims. (Cl. 208—198)

This invention relates to the sweetening of light petroleum distillates, particularly those sour distillates containing odoriferous mercaptans. In the process of the invention these mercaptans are converted to less objectionable compounds, e.g., disulfides, by passage through a fixed catalyst bed to produce a sweet non-corrosive product. The catalyst bed is composed of particles of a suitable inert base material, such as furnace slag, Carborundum or other carrier, coated with a material composed largely of lead sulfide.

A process is known wherein the sour distillate before passing through such a catalyst bed is mixed with caustic and an amount of elemental slufur slightly in excess of that theoretically needed to convert the mercaptans to disulfides. Air or oxygen is usually also mixed with the sour distillate. The air in such a process tends to convert the lead sulfide to sodium plumbite in the presence of caustic. The sodium plumbite reacts with the mercaptans to form lead mercaptides which are oil soluble and which are in turn converted to the non-odoriferous organic disulfides with the concomitant formation of oil-insoluble lead sulfide by the added sulfur. This is the well-known "doctor" reaction. However small amounts of the lead mercaptides often remain unconverted, and some of the lead sulfide formed is in colloidal or finely divided form, so that these materials are carried overhead with the treated distillate, thus degrading its quality (as by loss of color), causing plugging of the catalyst bed, and resulting in loss of lead from the catalyst.

In the prior process the color bodies formed, such as lead mercaptides and other lead products, cannot be readily washed from the treated product to restore the color. An excess of elemental sulfur in the prior process is often added in an attempt to convert such residual lead mercaptides to disulfides. Some of the excess sulfur then appears in the sweetened product and tends to make it corrosive. Additionally there is often a reduction in octane number as a result of the presence of such excess elemental sulfur. There is also a tendency to plug the bed of solid catalyst because of the formation of gels when organic acids, such as naphthenic acids, are also present in the system. Such gels are commonly formed in the conventional "doctor" sweetening process. To minimize the difficulties enumerated, it is necessary to exert close control over the relative amounts of oxygen, sulfur and alkali in order to obtain the desired results, and this is often difficult under actual commercial operating conditions.

The process of the invention is characterized by the addition of an aqueous sodium sulfide solution to the catalyst bed in such manner that the lead sulfide coatings on the particles are constantly bathed by the sodium sulfide solution to maintain the coatings as lead sulfide. In some practices of the process no elemental sulfur need then be employed. Sufficient oxygen should be added, usually in the form of air, or be present in the distillate or sodium sulfide solution to cause the mercaptans in the sour distillate to react to produce the desired reaction products, i.e., disulfides. The amount of air will usually be in the neighborhood of 0.4–0.5 cubic feet (under standard conditions) per barrel of distillate for each .01% of mercaptan, expressed as sulfur. Any sodium plumbite formed as a result of oxidation of the lead sulfide catalyst by the oxygen is immediately precipitated as lead sulfide by the sodium sulfide that is present. Similarly, if any excess oxygen reacts with lead mercaptides to produce disulfides and lead oxide, the latter is immediately reacted by the sodium sulfide present to produce and maintain the catalyst as lead sulfide.

Thus in the new process of the invention there is no color loss in the operation, and the product is sweet and non-corrosive. The new process avoids separation or carryover problems that have long plagued prior processes, and the control of the added reagents is much less critical than in former processes. The chemical costs are usually less than those experienced in prior processes. When used on gasolines the new process increases the lead susceptibility of the gasoline and does not degrade the octane number thereof.

It has been found that when the process is applied to petroleum distillates boiling in the range of gasoline or light naphtha, typically on light distillates with end points not greater than about 450° F. (232° C.), sweetening can be effected without the addition of sulfur. Furthermore, the sodium sulfide solution is sufficiently alkaline so that no caustic soda need be added. With such stocks the process has been successfully used on straight run, catalytically cracked, and thermally cracked materials. The mercaptan content thereof is not critical as it is primarily a matter of time of contact with the catalyst to produce the required sweetening. With straight run gasolines a preliminary wash with weak caustic is usually desirable to remove hydrogen sulfide and also naphthenic acids if present, as by mixing the sour stock with a relatively weak caustic solution of a strength of about 3–20% by weight and separating in a known manner. Cracked gasolines are usually preliminarily washed with a strong caustic to remove cresols and thiocresols which would also interfere with the sweetening process. The cracked gasoline may be mixed with a relatively strong caustic solution of a strength of about 30–50% by weight and the mixture separated.

Elemental sulfur can be used in conjunction with the sodium sulfide solution on occasional gasoline streams that are difficult to sweeten. Such use of sulfur is generally desirable on light petroleum distillates boiling above the gasoline boiling range, e.g., on kerosene, diesel fuel and gas oils. It has the advantage of avoiding plugging of the catalyst bed. If the color of the distillate is degraded, which sometimes apparently unavoidably occurs, the color can be restored by a simple water-wash step applied to the effluent stream. The sodium sulfide appears to change the character of the color bodies to permit their removal by washing, which is not possible in the prior process employing no sodium sulfide addition.

In both practices of the invention the amount of sodium sulfide added to the system is usually small and is dependent upon the mercaptan content of the oil stream. It is partly consumed during the process, but a small excess of sodium sulfide keeps any lead oxide formed converted to the sulfide. The sodium sulfide is usually used in aqueous solution of about 5–15% strength, by weight. The amount of sodium sulfide added to the catalyst bed should be such that the spent solution separated from the treated distillate should contain a small residual amount of sodium sulfide to avoid a loss of lead in the form of soluble lead compounds. It is desirable that no soluble lead should be present in such spent solution. If any lead appears therein the amount of sodium sulfide, air, or sulfur addition should desirably be increased. In the practice of the process on gasoline, in which no elemental sulfur is added, the amount of sodium sulfide will ordinarily be about 10 lbs. per 1000 barrels of distillate for each .01% of mercaptan, expressed as sufur, present in the sour distillate. For the heavier distillates from 10 to 50 lbs. per 1000 barrels for each .01% mercaptan may be required.

Oxygen is usually added to the system in the form of air mixed with the sour distillate stream ahead of the catalyst bed. It is necessary to supply a sufficient amount of oxygen to carry out the oxidation of the mercaptans to the disulfides, but a large excess must be avoided since this can cause unnecessary oxidation of lead sulfide, which then in turn requires more sodium sulfide to reconvert the lead to the sulfide. This is costly and may also bring about the formation of the undesirable lead mercaptide, as previously discussed. The latter is especially true if any of the added air remains in undissolved form, i.e., as gas bubbles. Consequently only as much air as can be dissolved in the distillate under the existing temperature and pressure should be introduced. It has been found that about 0.5 cubic feet of air (under standard conditions) per barrel of distillate for each .01% mercaptan content (expressed as sulfur) is adequate for the sweetening. Not more than this should be used, and if the mercaptan content is so high that the necessary amount of air can not all be dissolved, sufficient pressure should be applied to the system to make it go into solution. A simple way of determining whether enough air has been added is to measure the oxygen content of the fixed gases separating under reduced or atmospheric pressure from a sample of the treated distillate after passage through the catalyst bed. There should be not more than about 1 or 2% (preferably not more than 0.5%) by volume of oxygen in such gases. Larger amounts indicate excessive quantities of air have been introduced, and this should not be continued.

When the mercaptan content of the sour distillate is quite low, the system may contain sufficient oxygen to make the addition of extra air unnecessary.

It is sometimes desirable in the present process to add a small amount of caustic to the system to neutralize any acidity present, such as naphthenic acids or hydrogen sulfide. The caustic is most commonly mixed with the sodium sulfide solution in an amount to have a concentration of about 0.1 to 0.5 weight percent in the mixture. The amount added is not critical, but should be kept to a minimum for economic reasons. While such neutralization can be accomplished by the sodium sulfide solution alone, since it is inherently strongly alkaline, it is more economical to effect the neutralization with caustic.

The sodium sulfide and caustic solutions can be added to the system by being mixed with the sour distillate. The air or oxygen may likewise be mixed with the sour distillate. When all such materials are intermixed it is desirable that the mixture be introduced into the top of the catalyst tower to flow downward therethrough. An upward flow of such a mixture through the mass would sometimes not give as good results, because the aqueous solution tends to gravitate from the mixture during the upflow and does not reach the upper regions of the bed in sufficient amount to maintain the lead sulfide coatings on the particles. However it is possible to carry the sodium sulfide solution practically to the top by recycling some of the overhead distilate to the mixture to increase the upward space velocity. Recycle of the overhead distillate to the incoming sour stream is otherwise not necessary or desirable as concerns the effectiveness of the sweetening.

Alternatively and desirably the sour distillate can be introduced into the bottom of the tower and the sodium sulfide solution or the mixed sodium sulfide and caustic solution into the top thereof so that these materials counterflow in the bed. The solution will then trickle down through the bed and insure that all of the particles thereof are contacted by the sodium sulfide. This is often the preferred method of operation and gives better and more consistent results as compared with initially mixing the solution with the sour distillate. If such a counterflow operation is used in the practice of the invention employing elemental sulfur the latter is mixed with the sour distillate before its upward flow in the bed.

An important feature of the invention is that the air and sulfide addition is not critical, provided large excesses are avoided as mentioned above. This is not true with prior sweetening processes since only a slight excess of the sulfur used therein will produce a corrosive product and a slight deficiency will produce a sour oil. The new process has the advantage that there are fewer instances of production of off-specification material.

The operating temperature is not critical but should desirably be maintained at a substantially constant value throughout the bed. In this connection it is desirable that the catalyst bed be heat-insulated from the surrounding atmosphere. The usual operating temperature range will be about 70–130° F. (21–54° C.).

The attached drawing suggests apparatus useful in all practices of the process. For simplicity, the process as applied to a gasoline stream, where no sulfur addition is required, will first be described.

Referring to the drawing, the tower 10 contains a screen or perforated plate 11 supporting a layer of rock 12 which in turn supports a lower section 13 of the catalyst bed. Shallow layers of rock 14, 15 and 16 support intermediate sections 17 and an uppermost section 18 of the catalyst bed. A rock mass 19 may fill the top of the tower. The sections 13, 17 and 18 whether integrated or separated by the shallow rock layers 14, 15 and 16 constitute the catalyst bed. Samples can be withdrawn from the shallow rock layers 14, 15 and 16 through the valved perforated pipes 14a, 15a and 16a or these pipes may be used as influent pipes in some instances. One or more towers may be used in series or parallel when more time, lower velocities, etc., are desirable.

The sour distillate is advanced by a pump 20 through a line 21 containing a mixing device 22, which may be a mixing valve. The mixture may be delivered through a valve 23 to a perforated pipe ring 24 below the screen or perforated plate 11. Air or oxygen can be supplied to the line 21 through a pump or blower 25 as controlled by a valve 26 and will be intimately mixed with the sour distillate by the mixing device 22.

The sodium sulfide solution can be made up in a tank 33 and advanced by a pump 34 through a valve 35 discharging into the line 21. In this instance the mixture from the mixing device 22 will flow upward through the catalyst bed. The sweet distillate is collected in a perforated pipe ring 37 in or above the rock mass 19 and is discharged through a line 38 through a back pressure valve 39 to a storage or settling tank 40 where residual spent solution may settle and be withdrawn through a line 41 for testing or monitoring the process. Excess air or oxygen in the sweet distillate will separate therefrom in the tank 40.

Any sodium sulfide solution settling from the mixture during rise through the catalyst bed will collect as a body 44 in the bottom of the tower and can be withdrawn through a line 45 equipped with a valve 46 controlling the flow. A level controller 47 is operatively connected to this valve to maintain the level of the body 44 below the perforated pipe ring 24. It is desirable that the incoming mixture should not wash through the liquid of the body 44. To increase the upward velocity through the bed and maintain even the uppermost particles therein wetted by the sodium sulfide solution a portion of the stream can be bypassed from the line 38 to the line 21 to blend with the incoming stream thus increasing the volume and correspondingly the upper velocity of the mixture in the bed.

It is sometimes better to flow any mixture from the mixing device 22 downwardly through the catalyst bed to insure that all of the catalytic particles remain wetted or contacted by the sodium sulfide solution. In this instance the valve 23 may be closed and a valve 50 in a line 51 opened to deliver the mixture to a perforated pipe ring 52 in the rock mass 19 below the ring 37. In this instance the sweetened product and any residual sodium sulfide solution can be withdrawn through the perforated pipe ring 24 by opening a valve 54 in a line 55 leading to a storage or settling tank 56. The function thereof is similar to the tank 38 previously described and the line 55 may extend to the latter if desired.

Even better results can usually be obtained by counterflowing the sodium sulfide solution and the sour distillate in the catalyst bed. To accomplish this the valve 35 may be closed and a valve 57 opened to deliver the sodium sulfide solution to the line 51 and its perforated pipe ring 52 to flow downward in the bed. The valve 23 will be open to permit the sour distillate to discharge through the perforated pipe ring 24 to raise upward through the bed and be discharged through the line 38 to the settling tank 40 as previously described. The spent solution of sodium sulfide will be withdrawn from the bottom at a rate to maintain the level of the body 44 below the ring 24.

As an example of this type of operation a straight run gasoline that had been washed by a 10% caustic solution was moved upward through a catalyst bed composed of particles of furnace slag coated with lead sulfide at rates varying between 2,100 and 3,000 barrels per day at a temperature of 115° F. Air was introduced at rates varying from 0.5 to 1.5 cubic feet per barrel at standard conditions. The pressure in the vessel was about 27 lbs. per square inch and the pressure drop across a mixing valve, used as the mixing device 22, was about 5 lbs. per square inch. Sodium sulfide was introduced into the top of the tower at a rate varying from 5 to 15 lbs. per 1000 barrels for each .01% mercaptan, being introduced as an aqueous solution of a strength between 7% and 10%. The distillate stream supplied to the bed had a mercaptan content varying in the range of about 0.02 to 0.034% and the process produced a sweet distillate in which the mercaptans were reduced to 0.0001 to 0.0003% with no deterioration in color and no corrosivity. No water wash was needed to produce these results and give a commercially acceptable product. The fixed gases from the sweetened distillate contained about 1.0% oxygen. Prolonged operation gave no evidence of pressure drop across the bed, indicating the absence of plugging. The spent sodium sulfide solution withdrawn from the bottom of the tower contained about 2% sodium sulfide.

In the embodiment of the invention where it is required to add elemental sulfur to the distillate, the steps of the process are similar, except that the sodium sulfide solution should not be intimately mixed with the distillate stream when the latter contains elemental sulfur, since in that case the formation of sodium polysulfides takes place, thus extracting the sulfur from the oil into the aqeuous phase. Therefore the aqueous and oil phases need to be separately introduced into the tower either countercurrently as described for the previous system, or concurrently at the top, flowing downwardly, or with the aqueous phase being added at some intermediate point, as through the perforated pipes 14a, 15a or 16a.

Where elemental sulfur is to be added, a side stream of the sour distillate can be moved through a sulfur pot 58 by a pump 59 under the control of a valve 60 to pick up some of the elemental sulfur, the side stream being then returned to the pipe 21. Caustic, if used, is usually added to the sodium sulfide solution in the supply tank 33. The solution in the supply tank 33 is then advanced by the pump 34, through a valve 61 in a separate line 62 leading to a separate distributor shown as a perforated pipe ring 63 at the top of the tower. This then provides the means for the countercurrent or concurrent flow of the oil and the sodium sulfide solutions, while avoiding the strong mixing contact which would result from flowing the combined streams through mixing devices or small pipes. In the countercurrent operation the distillate rises from the perforated pipe ring 24 while the sodium sulfide solution drops from the perforated pipe rings 52 or 63. In the concurrent operation the distillate flows through the line 51 to the perforated pipe ring 52 while aqueous solution is delivered through the line 62 to the perforated pipe ring 63. It is also possible to connect one or more of the perforated pipes 14a, 15a and 16a to the line 62 to introduce the aqueous material at some intermediate section of the catalyst bed while the sour distillate is moving upward therein, in which event some of this aqueous solution may be carried upwardly into the upper portions of the bed and some may join coalesced masses of the aqueous solution and move downward in the lower portions of the bed. If a water wash of the effluent distillate is desired water can be introduced into the line 38 from a pressure source under the control of a valve 64 to be mixed with the distillate and separated therefrom into the tank 40. A similar water wash ahead of the tank 56 can be effected by water supplied to the line 55 through a valve 65 and suitably mixed with the distillate.

As an example of the operation when conducted on a distillate in which elemental sulfur was required to be added, a kerosene distillate in the boiling range of 350–530° F. was mixed with elemental sulfur to a concentration of 16.8 lbs. per 1000 barrels of distillate and with about 0.5 cubic feet of air (at standard conditions) per barrel of distillate. The resulting stream was moved upward at a rate of 3,000 barrels per day through a catalyst bed as in the previous example. The mixing device 22 was a valve, and the pressure drop thereacross was about 15 lbs. per square inch, the pressure in the vessel being about 20 lbs. per square inch. Sodium sulfide was introduced into an intermediate injection point in the tower, e.g., through either the perforated pipe 14a or 15a, at a rate of about 46 pounds per 1000 barrels of distillate in the form of an aqueous solution having a strength of about 5% by weight. The solution also contained sodium hydroxide in a concentration of 4.3%. The sour distillate stream supplied to the bottom of the bed had a mercaptan content of .0125% and the process produced a sweet distillate in which the mercaptans were reduced to less than .0004%. The fixed gases from the sweetened distillate contained about .5% oxygen. The original color of the sour distillate was +30 Saybolt and of the treated distillate +26. After washing the treated distillate with about 5 volume percent of water the color was restored to +30 Saybolt. The treated distillate, both before and after water-washing, was sweet and non-corrosive. When no sodium sulfide was added to the system the color of the effluent distillate was +26 and could not be improved or returned to +30 by any water-washing operation.

The catalyst bed to be used for the sweetening can be prepared as follows. An inert carrier material such as furnace slag, Carborundum, etc., can be crushed to .6–1 cm., usually .8 cm. or smaller. These particles are usually wetted with a binder such as sodium silicate or metasilicate and then coated with lead oxide or a lead salt such as lead acetate. The coated particles are introduced into the tower 10 in this state and the bed is then activated to convert the lead oxide or salt to lead sulfide. It is known that this conversion can be accomplished by supplying to the bed a sour distillate containing an excess of elemental sulfur.

A better way of converting the lead oxide or salt to lead sulfide is to dry the mass by air blowing it at about 120–180° C., filling the tower with distillate, and passing hydrogen sulfide therethrough. This converts the coatings to lead sulfide and conditions the catalyst more rapidly than is possible by the use of an excess of elemental sulfur in a sour distillate.

Although the above description outlines exemplary embodiments of the invention it will be apparent that various changes and modifications can be made therein and are within the scope of the appended claims.

We claim:

1. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied separately from said distillate to the bed in a manner to contact the coated particles thereof with said sodium sulfide solution, thereby maintaining the lead sulfide as lead sulfide during the time the sour distillate is flowing through said fixed catalyst bed, and continuously withdrawing sweetened distillate from said fixed catalyst bed.

2. A process as defined in claim 1 in which the sour distillate contains a small amount of elemental sulfur added thereto before passage through said bed, and in which a stream of the sour sulfur-containing distillate is introduced at a lower position to flow upward in said catalyst bed, and in which a stream of the sodium sulfide solution is introduced at an upper position to effect a counterflow of the sour sulful-containing distillate and the sodium sulfide solution in at least a portion of said catalyst bed.

3. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to the bed in a manner to contact the coated particles thereof with said sodium sulfide solution, thereby maintaining the lead sulfide as lead sulfide during the time the sour distillate is flowing through said fixed catalyst bed, the sodium sulfide solution being mixed with the sour distillate before passage through said bed, the mixed sodium sulfide solution and sour distillate being passed downwardly through said bed, and continuously withdrawing sweetened distillate from the catalyst bed.

4. A process for sweetening sour light petroleum distillate by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to the bed in a manner to contact the coated particles thereof with said sodium sulfide solution, thereby maintaining the lead sulfide as lead sulfide during the time the sour distillate is flowing through said fixed catalyst bed, the sodium sulfide solution being introduced into the catalyst bed at an upper position to counterflow the sour distillate introduced at a lower position, and continuously withdrawing sweetened distillate from said fixed catalyst bed.

5. A process as defined in claim 4 in which said sodium sulfide solution as a stream is introduced into said fixed catalyst bed at a position between the top and bottom thereof.

6. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to the bed in a manner to contact the coated particles thereof with said sodium sulfide solution, thereby maintaining the lead sulfide as lead sulfide during the time the sour distillate is flowing through said fixed catalyst bed, a stream of the sour distillate and said sodium sulfide solution being introduced as a stream to flow concurrently through at least a portion of said fixed catalyst bed, and continuously withdrawing sweetened distillate from said fixed catalyst bed.

7. A process as defined in claim 6 in which both said distillate and said sodium sulfide solution are introduced near the top of said fixed catalyst bed to flow concurrently downwardly therethrough.

8. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to the bed in a manner to contact the coated particles thereof with said sodium sulfide solution, thereby maintaining the lead sulfide as lead sulfide during the time the sour distillate is flowing through said fixed catalyst bed, continuously withdrawing sweetened distillate from said fixed catalyst bed, and water-washing the withdrawn sweetened distillate.

9. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to the bed in a manner to contact the coated particles thereof with said sodium sulfide solution, thereby maintaining the lead sulfide as lead sulfide during the time the sour distillate is flowing through said fixed catalyst bed, and continuously withdrawing sweetened distillate from said fixed catalyst bed, said oxygen being added to the sour distillate in amount sufficient to maintain a small amount of oxygen in the sweetened distillate.

10. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to the bed in a manner to contact the coated particles thereof with said sodium sulfide solution, thereby maintaining the lead sulfide as lead sulfide during the time the sour distillate is flowing through said fixed catalyst bed, the oxygen being present as a result of air supplied to the distillate at a rate of about 0.4–0.5 cubic feet of air, at standard conditions, per barrel of distillate for each .01% of mercaptan, expressed as sulfur, in the sour distillate, and continuously withdrawing sweetened distillate from said fixed catalyst bed.

11. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide supplied to said fixed catalyst bed in a manner to contact the coated particles thereof with said sodium sulfide solution, thereby maintaining the lead sulfide as lead sulfide during the time the sour distillate is flowing through said fixed catalyst bed, continuously withdrawing sweetened distillate from said fixed catalyst bed, separating a spent solution from the withdrawn sweetened distillate, and controlling the amount of said sodium sulfide solution to insure that the spent solution contains a small residual amount of sodium sulfide.

12. A process for sweetening sour light petroleum distillates by conversion of mercaptans therein to disulfides by use of a fixed catalyst bed of inert solid particles coated with a catalyst consisting largely of lead sulfide, which process is characterized by the steps of flowing the sour distillate through said fixed catalyst bed having in contact therewith an amount of oxygen sufficient to convert the mercaptans to disulfides and in the presence of an aqueous lead sulfide catalyst vitalizing solution of sodium sulfide of a strength of about 5–15% by weight supplied to said fixed catalyst bed in a manner to contact the coated particles thereof with said sodium sulfide solution, thereby maintaining the lead sulfide as lead sulfide during the time the sour distillate is flowing through said fixed catalyst bed, and continuously withdrawing sweetened distillate from said fixed catalyst bed.

13. A process for sweetening sour light petroleum distillates by conversion of mercaptans therein to disulfides by use of a fixed catalyst bed of inert solid particles coated with a catalyst consisting largely of lead sulfide, which process is characterized by the steps of first producing a bed of inert solid particles coated with lead oxide, converting such lead oxide coatings to lead sulfide coatings by flooding the bed with a petroleum distillate and contacting the solid particles of the flooded bed with hydrogen sulfide to produce said fixed catalyst bed, flowing the sour distillate through the resulting fixed catalyst bed having in contact therewith an amount of oxygen sufficient to convert the mercaptans to disulfides and in the presence of an aqueous lead sulfide catalyst vitalizing solution of sodium sulfide supplied to such fixed catalyst bed in a manner to contact the coated particles thereof with said sodium sulfide solution, thereby maintaining the lead sulfide as lead sulfide during the time the sour distillate is flowing through such fixed catalyst bed, and continuously withdrawing sweetened distillate from such fixed catalyst bed.

References Cited by the Examiner
UNITED STATES PATENTS

| | | | |
|---|---|---|---|
| 2,879,227 | 3/1959 | Brooks et al. | 208—198 |
| 3,014,861 | 12/1961 | Buningh | 208—287 |
| 3,050,460 | 8/1962 | Brooks | 208—198 |

OTHER REFERENCES

Nutt et al.: Treating light distillates by the PbS process, National Petroleum News, April 28, 1937.

DELBERT E. GANTZ, *Primary Examiner.*

ALPHONSO D. SULLIVAN, *Examiner.*